US012205478B1

(12) United States Patent
Patel et al.

(10) Patent No.: US 12,205,478 B1
(45) Date of Patent: Jan. 21, 2025

(54) UPLOADING A MISSION PLAN TO A REMOTE VEHICLE

(71) Applicants: Dhaval D. Patel, San Diego, CA (US); Nathan John Miller, San Diego, CA (US)

(72) Inventors: Dhaval D. Patel, San Diego, CA (US); Nathan John Miller, San Diego, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 232 days.

(21) Appl. No.: 18/149,511

(22) Filed: Jan. 3, 2023

(51) Int. Cl.
*G08G 5/00* (2006.01)
*H04L 67/12* (2022.01)
*H04L 69/085* (2022.01)

(52) U.S. Cl.
CPC ........... *G08G 5/0039* (2013.01); *H04L 67/12* (2013.01); *H04L 69/085* (2022.05)

(58) Field of Classification Search
CPC ...... G08G 5/0039; H04L 67/12; H04L 69/085
See application file for complete search history.

(56) References Cited

U.S. PATENT DOCUMENTS

| | | | |
|---|---|---|---|
| 9,669,904 B2 | 6/2017 | Hanson et al. | |
| 9,690,289 B2 | 6/2017 | Yang et al. | |
| 9,980,267 B2 | 5/2018 | Jalali | |
| 10,178,535 B2 | 1/2019 | Huber et al. | |
| 10,494,093 B1 | 12/2019 | Miralles | |
| 11,064,363 B2 | 7/2021 | Fox et al. | |
| 2015/0232097 A1* | 8/2015 | Luther | G01C 21/3415 701/1 |
| 2018/0026705 A1* | 1/2018 | Parks | H04B 7/26 701/2 |

* cited by examiner

*Primary Examiner* — Seth A Silverman
(74) *Attorney, Agent, or Firm* — Tarolli, Sundheim, Covell & Tummino LLP

(57) ABSTRACT

A mission plan module generates a mission plan for a deployed remote vehicle. The mission plan comprises a plurality of commands for the deployed remote vehicle. A burst upload module receives the mission plan and selects a given subset of the plurality of commands. The burst mode module transmits the given subset of commands to a data link interface (DLI) module over a network. The given subset of commands is transmitted with a burst mode operation based on burst rate parameters, causing the DLI module to transmit the given subset of commands to the deployed remote vehicle through a ground communication element. The burst mode module receives a set of response messages from the remote vehicle responsive to the given subset of commands and selects a next subset of the plurality of commands. The burst mode module transmits the next subset of commands to the DLI module over the network.

20 Claims, 4 Drawing Sheets

UPLOADING A MISSION PLAN TO A REMOTE VEHICLE

GOVERNMENT INTEREST

The invention was made under Government Contract. Therefore, the US Government has rights to the invention as specified in that contract.

TECHNICAL FIELD

The present disclosure relates to uploading a mission plan to a remote vehicle.

BACKGROUND

An unmanned aerial vehicle (UAV), commonly known as a drone, is an aircraft without any human pilot, crew, or passengers on board. UAVs are a component of an unmanned aircraft system (UAS), which includes adding a ground-based controller and a system of communications with the UAV. The flight of UAVs may operate under remote control by a human operator, as remotely-piloted aircraft (RPA), or with various degrees of autonomy, such as autopilot assistance, up to fully autonomous aircraft that have no provision for human intervention.

Burst mode is a generic electronics term referring to a situation in which a device is transmitting data repeatedly without going through all the steps required to transmit each piece of data in a separate transaction.

SUMMARY

One example relates to a non-transitory machine readable medium having machine executable instructions. The machine executable instructions include a mission plan module that generates a mission plan for a deployed remote vehicle based on user input. The mission plan includes a plurality of commands for the deployed remote vehicle. The machine executable instructions also include a burst upload module that receives the mission plan. The burst upload module selects a given subset of commands of the plurality of commands for the deployed remote vehicle and transmits the given subset of commands to a data link interface (DLI) module over a network, the given subset of commands is transmitted with a burst mode operation based on burst rate parameters, causing the DLI module to transmit the given subset of commands to the deployed remote vehicle through a ground communication element. The burst mode module receives a set of response messages from the remote vehicle responsive to the given subset of commands and selects a next subset of commands of the plurality of commands for the deployed vehicle. The burst mode module transmits the next subset of commands to the DLI module over the network if the response messages indicate that each command in the given subset of commands has been accepted for execution by the deployed remote vehicle and terminates a transmission of the plurality of commands if the response messages indicate that a particular command in the given subset of commands has been rejected for execution by the deployed remote vehicle.

Another example relates to a system for uploading a mission plan to a deployed remote vehicle. The system includes a memory for storing machine executable instructions and a processor core that accesses the memory and executes the machine readable instructions. The machine executable instructions includes a mission plan module that generates a mission plan for a deployed remote vehicle based on user input. The mission plan includes a plurality of commands for the deployed remote vehicle. The machine executable instructions also include a burst upload module that receives the mission plan and selects a given subset of commands of the plurality of commands for the deployed remote vehicle. The burst upload module transmits the given subset of commands to a DLI module on a first stream of packets of a first protocol, the given subset of commands is transmitted with a burst mode operation based on burst rate parameters. The burst mode module receives a set of response messages from the remote vehicle responsive to the given subset of commands and selects a next subset of commands of the plurality of commands for the deployed remote vehicle. The burst mode module transmits the next subset of commands on the first stream of packets of a first protocol if the response messages indicate that each command in the given subset of commands has been accepted for execution by the deployed remote vehicle and terminates a transmission of the plurality of commands if the response messages indicate that a particular command in the given subset of commands has been rejected for execution by the deployed remote vehicle. The system includes a DLI controller that executes the DLI module. The DLI module converts the first stream of packets in the first protocol into a second stream of packets in a second protocol. The DLI module transmits the second stream of packets to a ground communication element (GCE). The GCE includes an antenna that wirelessly communicates with the deployed remote vehicle to send the second stream of packets to the deployed remote vehicle and to receive the set of response messages from the deployed remote vehicle.

Yet another example relates to a method for transmitting a mission plan to a deployed remote vehicle. The method includes receiving, by a burst upload module executing on a computing platform, a mission plan for a deployed remote vehicle. The mission plan includes a plurality of commands for the deployed remote vehicle. The method includes selecting, by the burst upload module, a given subset of commands of the plurality of commands for the deployed remote vehicle and transmitting, by the burst upload module, the given subset of commands to a DLI module over a network. The given subset of commands is transmitted with a burst mode operation based on burst rate parameters, causing the DLI module to transmit the given subset of commands to the deployed remote vehicle through a ground communication element. The method includes receiving, by the burst upload module, a set of response messages from the remote vehicle responsive to the given subset of commands and transmitting, by the burst upload module, a next subset of commands of the plurality of commands to the DLI module over the network if the response messages indicate that each command in the given subset of commands has been accepted for execution by the deployed remote vehicle and terminates a transmission of the plurality of commands if the response messages indicate that a particular command in the given subset of commands has been rejected for execution by the deployed remote vehicle.

DETAILED DESCRIPTION

Figure 1:
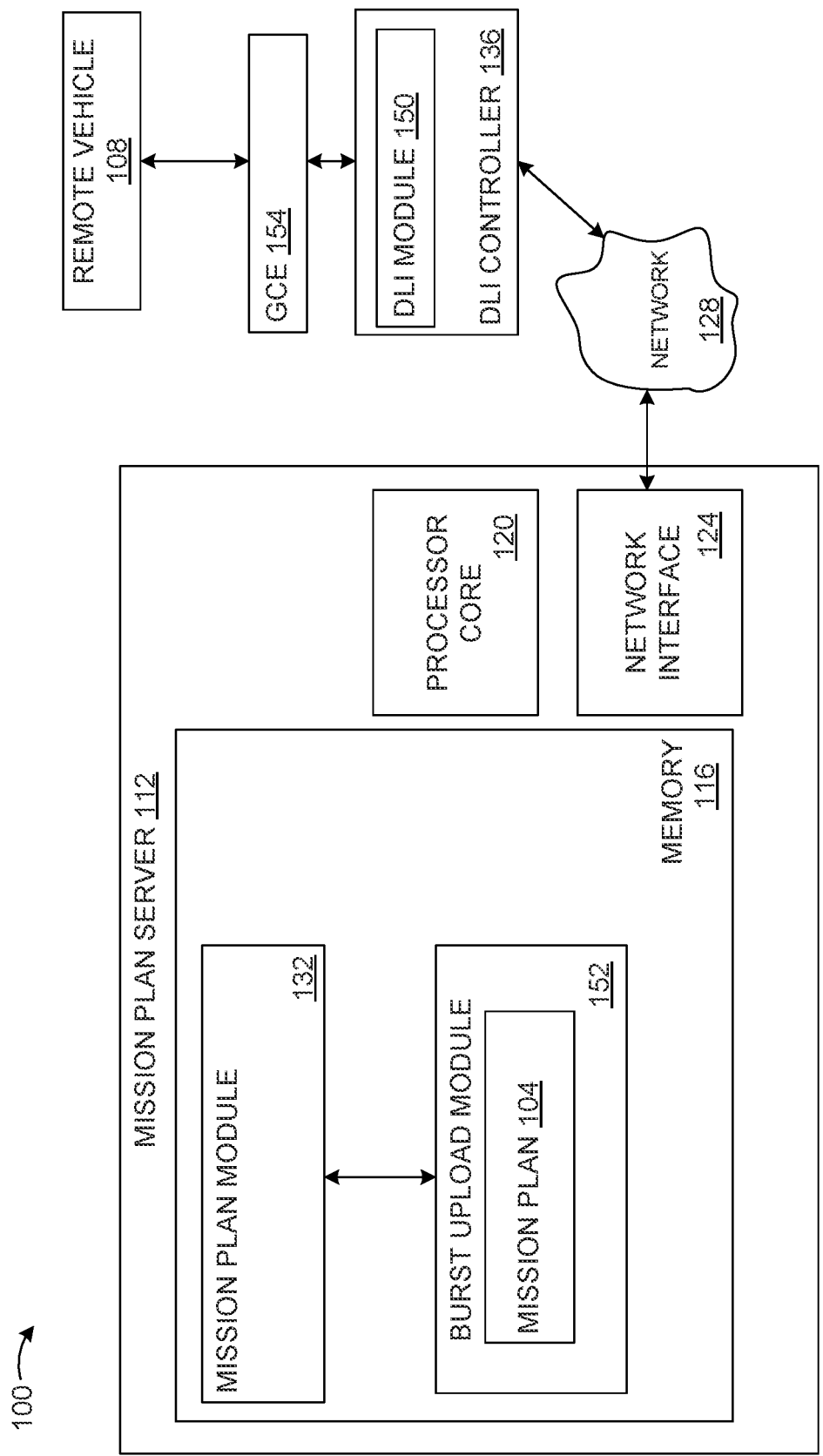
FIG. 1 illustrates an example of a system for uploading a mission plan to a deployed remote vehicle using burst mode operations.

This description relates to systems and methods for uploading a mission plan to a deployed remote vehicle, such as an unmanned ariel vehicle (UAV). The mission plan can be uploaded to change/replace a previously loaded mission plan.

The system includes a computing platform (e.g., a server) executing a mission plan module that generates the mission plan for the deployed remote vehicle. The mission plan includes a plurality of commands for the deployed remote vehicle. The plurality of commands are an ordered set. The computing platform also executes a burst upload module that receives the mission plan.

The burst upload module employs burst mode operations to upload the mission plan to the deployed remote vehicle. More particularly, during the upload of the mission plan, the burst upload module selects a first subset of the plurality of commands of the mission plan based on burst mode parameters. The burst mode module transmits the first subset of commands to a data link interface (DLI) module on a first stream of packets of a first protocol (e.g., the user datagram protocol (UDP)).

The DLI module executes on a DLI controller (or other hardware). The DLI module converts the first stream of packets in the first protocol into a second stream of packets in a second protocol (e.g., a protocol defined in the MIL-STD-1553 standard or the Institute of Electrical and Electronics Engineers (IEEE) 1394 standard). The DLI module transmits the second stream of packets to a ground communication element (GCE). The GCE includes an antenna that wirelessly communicates the deployed remote vehicle to send the second stream of packets to the deployed remote vehicle.

The deployed remote vehicle processes each command and either accepts or rejects each command. In response to each such command, the deployed remote vehicle generates a response message that indicates whether a corresponding command has been accepted or rejected. The response messages are provided to the GCE in the second protocol. The GCE forwards the response messages in the second protocol to the DLI module. The DLI module converts the response messages to the first protocol and transmits the response messages in the first protocol to the burst upload module.

The burst mode module receives the response messages generated in response to the first subset of commands. The burst mode module can adjust burst mode parameters, and selects a second (next) set of commands to transmit to the deployed remote vehicle in a similar manner. After each of the commands in of the mission plan has been transmitted to the deployed remote vehicle, the burst upload operation ends.

By employment of the system and method described herein, the burst upload module sends each subset of the command of the mission plan in a burst operation. That is, in contrast to conventional approaches where a system sends individual commands and waits for a response for a given command prior to sending a next command, the burst upload module transmits the subset of commands (indirectly) to the deployed remote vehicle before waiting for the response messages. In this manner, the time needed to upload the mission plan to the deployed remote vehicle is curtailed.

FIG. 1 illustrates an example of a system 100 for uploading a mission plan 104 to a deployed remote vehicle 108 using burst mode operations. The deployed remote vehicle 108 can be, for example, a UAV such as a drone. Alternatively, the deployed remote vehicle 108 can be implemented as a terrestrial vehicle, such as an armored vehicle.

The system 100 includes a mission plan server 112. The mission plan server 112 is a computing platform (e.g., a computing device). The mission plan server 112 includes a non-transitory memory 116 that stores data and machine executable instructions. The non-transitory memory 116 is implemented as volatile memory (e.g., random access memory) or non-volatile memory, such as a solid state drive, a hard disk drive or a combination thereof. More generally, the non-transitory memory 116 is a non-transitory machine readable medium that has machine executable instructions. The mission plan server 112 also includes a processor core 120 (or multiple processor cores) that accesses the non-transitory memory 116 and executes the machine executable instructions. The mission plan server 112 also includes a network interface 124 (e.g., a network interface card) for accessing a network 128. The network 128 can be implemented as a public network (e.g., the Internet), a private network (e.g., a local area network or a proprietary network) or a combination thereof (e.g., a virtual private network).

The mission plan server 112 could be implemented in a computing cloud. In such a situation, features of the mission plan server 112, such as the processor core 120, the network interface 124 and the non-transitory memory 116 could be representative of a single instance of hardware or multiple instances of hardware with applications executing across the multiple of instances (e.g., distributed) of hardware (e.g., computers, routers, memory, processors, or a combination thereof). Alternatively, the mission plan server 112 could be implemented on a single dedicated server.

The mission plan server 112 can include a mission plan module 132 that can generate and/or update the mission plan 104 in response to user input or in response to input from another computing platform (e.g., a computing platform executing an artificial intelligence engine). In some examples, the mission plan module 132 can include a graphical user interface (GUI) for enabling selection of particular mission parameters.

The system 100 includes a data link interface (DLI) controller 136 (alternatively referred to as DLI hardware) that executes a DLI module 150. That is, the DLI controller 136 can execute embedded instructions (e.g., firmware), such as the DLI module 150. The DLI controller 136 is coupled to the network 128. The system 100 further includes a ground communication element (GCE) 154 that includes an antenna for wirelessly communicating with the deployed remote vehicle 108.

Prior to deployment, the remote vehicle 108 is loaded with an initial mission plan that could have been generated by the mission plan module 132. However, upon deployment, during prosecution of the mission plan, it may be desirable to change the initial mission plan for a myriad of reasons. These reasons can include, for example changing weather patterns, awareness of hostile entities, traffic congestion (e.g., particularly with respect to a UAV). Additionally or alternatively, the deployed remote vehicle 108 can reject a given command if the given command is unrecognized (e.g., in a wrong format or not applicable to the particular model of the deployed remote vehicle 108). In any such situations, the mission plan module 132 is employable to generate a new mission plan or revise the initial mission plan to provide the mission plan 104.

The mission plan 104 is an ordered set of instructions executable by the deployed remote vehicle 108. These instructions can include, but are not limited to maneuvering instructions (e.g., yaw, roll and pitch control) operational instructions (e.g., activate camera, lights and/or weapons), etc. In various examples, the ordered set of instructions can range from 2 instructions to 10,000 instructions (or more).

The system 100 includes a burst upload module 152 (e.g., a software algorithm) executing on the non-transitory memory 116. The burst upload module 152 receives the mission plan 104 from the mission plan module 132. Responsive to the mission plan 104, the burst upload module 152 initiates an upload procedure for the mission plan 104. The upload procedure uploads the mission plan 104 to the deployed remote vehicle 108 using burst mode operations. During the upload procedure, the burst upload module 152 selects a first subset of the commands of the mission plan 104 based on burst parameters. The first subset of commands is alternatively referred to as a burst count set. Stated differently, the subsets of the commands include a set number of the commands of the mission plan 104 (in order), and the number of commands within a particular subset are dictated by the burst parameters.

The first subset of commands are encapsulated into packets in a first protocol, such as the user datagram protocol (UDP) and the packets in the first protocol are transmitted to the DLI controller 136 through the network 128 in an iterative manner. A delay between each command, referred to as a wait interval, is set by the burst parameters. For instance, suppose that the burst parameters specify that there are 5 commands in each subset of command (each burst count set), and that there are 30 milliseconds between each command (e.g., the wait interval), as specified in the burst parameters. In this situation, the burst upload module 152 transmits (uploads) the first subset of the commands, namely commands 1-5 of the set of commands in UDP packets and provides the commands 1-5 to the burst upload module 152 via the network 128. The packets are added to (or used to form) a first stream of packets provided from the burst upload module 152 to the DLI controller 136.

Responsive to the first stream of packets that include the first subset of commands, the DLI module 150 converts the packets in the first protocol to packets in a second protocol, such as a protocol defined in the MIL-STD-1553 standard or the IEEE 1394 standard. These packets in the second protocol encapsulate the first subset of commands (e.g., commands 1-5), and are provided to the GCE 154 in a second stream of packets. Responsive to the second stream of packets in the second protocol, the GCE 154 wirelessly transmits the first subset of commands to the deployed remote vehicle 108. In some examples, error correction techniques (e.g., parity, forward error correction, etc.) ensure that the deployed remote vehicle 108 receives the first subset of commands. Stated differently, transmitting the first subset of commands from the burst upload module to the DLI module 150 causes the DLI module 150 to transmit the first subset of commands to the deployed remote vehicle 108 through the GCE 154.

The deployed remote vehicle 108 accesses the packets in the second protocol, and processes the first subset of commands individually. For each such command, the deployed remote vehicle 108 either accepts the command or rejects the command. Acceptance of a command indicates that the deployed remote vehicle 108 will execute the command during prosecution of the mission plan. In some situations, a particular command may be rejected because it is impossible to execute. For instance, if the particular command instructs the deployed remote vehicle 108 to drop to a particular altitude, but that altitude is below ground level, the deployed remote vehicle 108 may reject the command.

Responsive to each command in the first subset of commands (e.g., commands 1-5 of the mission plan 104), the deployed remote vehicle 108 wirelessly communicates a response message indicating acceptance or rejection of the corresponding message to the GCE 154 in the second protocol. Each response message corresponds to a particular command in the first subset of commands. However, the order of the response commands may not match the order of the commands in the first subset of commands. In the above example, the first subset of commands provides the commands 1, 2, 3, 4 and 5, in order. In such a situation, the deployed remote vehicle 108 could provide response messages for the commands in the following order 3, 2, 5, 1 and 4 (as one example). That is, the order of the response messages may be the same or different as the order of the command messages. The GCE 154 provides the response messages to the DLI module 150. Responsive to the response messages, the DLI module 150 converts the response messages encapsulated in the second protocol into packets in the first protocol. These packets in the first protocol are provided from the DLI module 150 to the burst upload module 152.

The burst upload module 152 un-encapsulates the packets in the first protocol to reveal the response messages. Each response message is analyzed. If a response message provided by the deployed remote vehicle 108 for the first subset of commands of the mission plan 104 is rejected, the burst upload module 152 terminates the upload of the mission plan 104 and provides the mission plan module 132 with an indication that the upload has been terminated. Additionally, in situations where the deployed remote vehicle 108 did not receive all of the command messages in the first subset of commands of the mission plan 104, the deployed remote vehicle 108 would provide less response messages than command messages in the first subset of commands of the mission plan 104. In this situation, the burst upload module 152 also terminates the upload of the mission plan 104 and provides the mission plan module 132 with an indication that the upload has been terminated. In any such situation, a user or an AI engine can evaluate the mission plan 104 and update or replace the mission plan 104 and the upload can be retried.

Conversely, if each response message provided by the deployed remote vehicle 108 for the first subset of commands of the mission plan 104 is accepted (e.g., indicating that the deployed remote vehicle 108 is set to execute the command), uploading of the mission plan 104 continues. To continue the upload of the mission plan 104, the burst upload module 152 determines if the burst parameters are to be adjusted (changed). Adjusting the burst parameters can include increasing or decreasing a number of commands in each subset of the commands of the mission plan 104 and/or increasing or decreasing the wait interval of the burst parameters. More generally, adjustment of the burst mode parameters increases a number of commands in a next subset of commands of the mission plan 104 and/or decreases an interval of time between transmission of commands in the next subset of commands. The burst upload module 152 selects a second (the next) subset of the commands of the mission plan 104, as specified by the burst parameters. Each subset of commands, including the first and second subsets of commands are disjoint subsets of the set of commands of the mission plan 104. The second subset of commands is transmitted to the deployed remote vehicle 108 in the same manner as the first subset of commands. In this manner, the second subset of commands is not transmitted to the deployed remote vehicle 108 until confirmation (the response messages) indicate that the first subset of commands have been accepted by the deployed remote vehicle 108. This process continues for the third, fourth, fifth, etc. subsets of commands until the last subset of commands is provided to the deployed remote vehicle 108 completing the upload process or until the deployed remote vehicle 108 rejects a command and the upload process is terminated.

In a conventional approach, individual commands of a mission plan are provided to the deployed remote vehicle 108. In this situation, after each command is provided to the deployed remote vehicle 108, the deployed remote vehicle 108 generates a response message before a subsequent command is sent. This creates a significant bottleneck that impacts the speed at which the mission plan of the deployed remote vehicle 108 can be revised. In contrast, the burst upload module 152 provides an entire burst of commands, namely, one of the subset of commands without waiting for a response. Additionally, the burst upload module 152 tunes the burst mode parameters after response messages for each subset of commands of the mission plan 104 are received by the burst upload module 152. Thus, the burst upload module 152 continually tunes the number of commands in a given subset, as well as the wait interval between sending each command in the given subset. In this manner, the overall time needed to upload the mission plan 104 to the deployed remote vehicle 108 is curtailed. In particular, this approach, namely, using burst mode to upload subsets of commands and adjusting the burst mode parameters ensure that the available bandwidth between the mission plan server 112 and the DLI controller 136 are fully leveraged (or nearly so) during the upload of the mission plan 104.

Figure 2A:
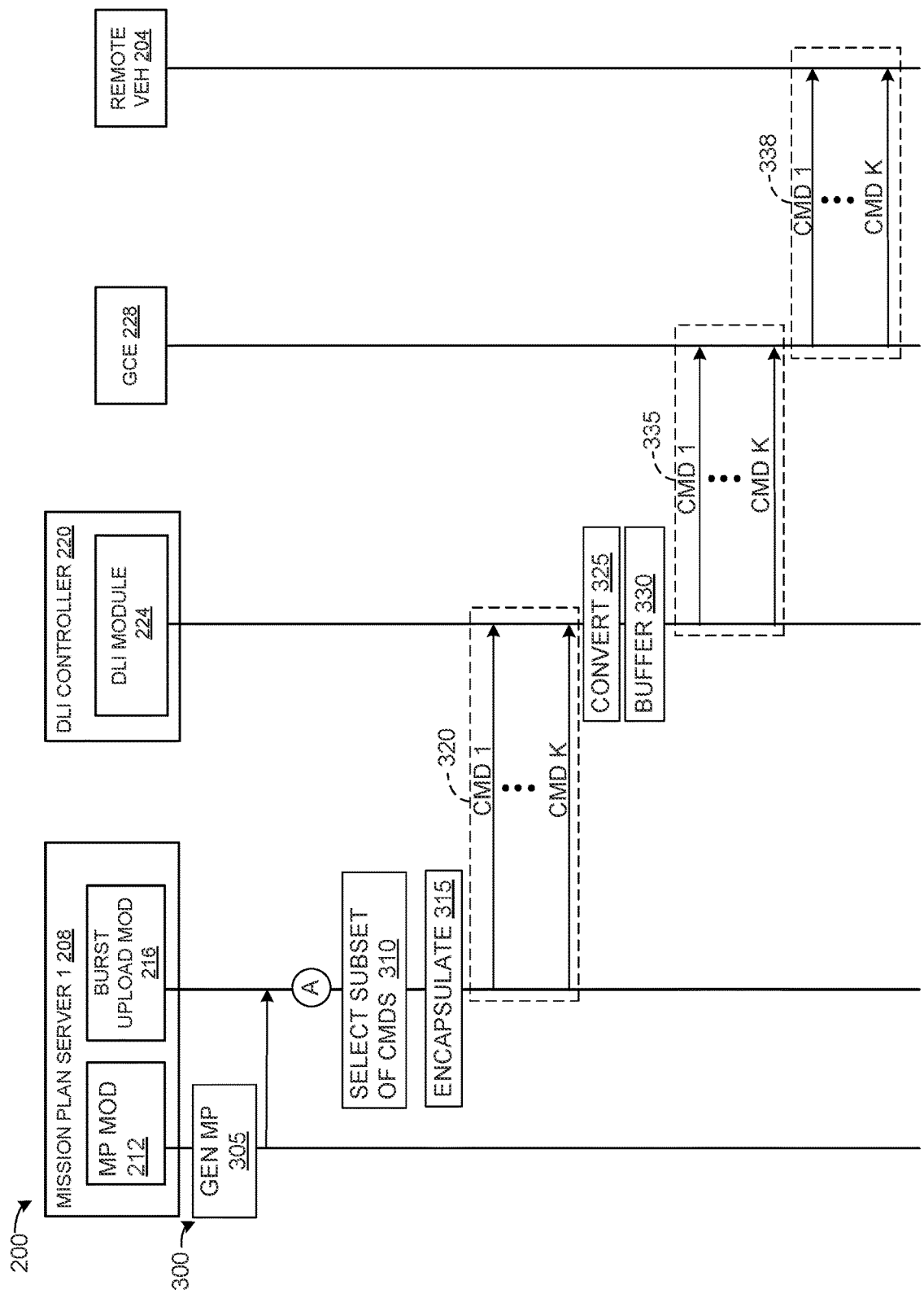
FIGS. 2A and 2B illustrate a sequence diagram for operations to upload a mission plan to a deployed remote vehicle using burst mode operations.
Figure 2B:
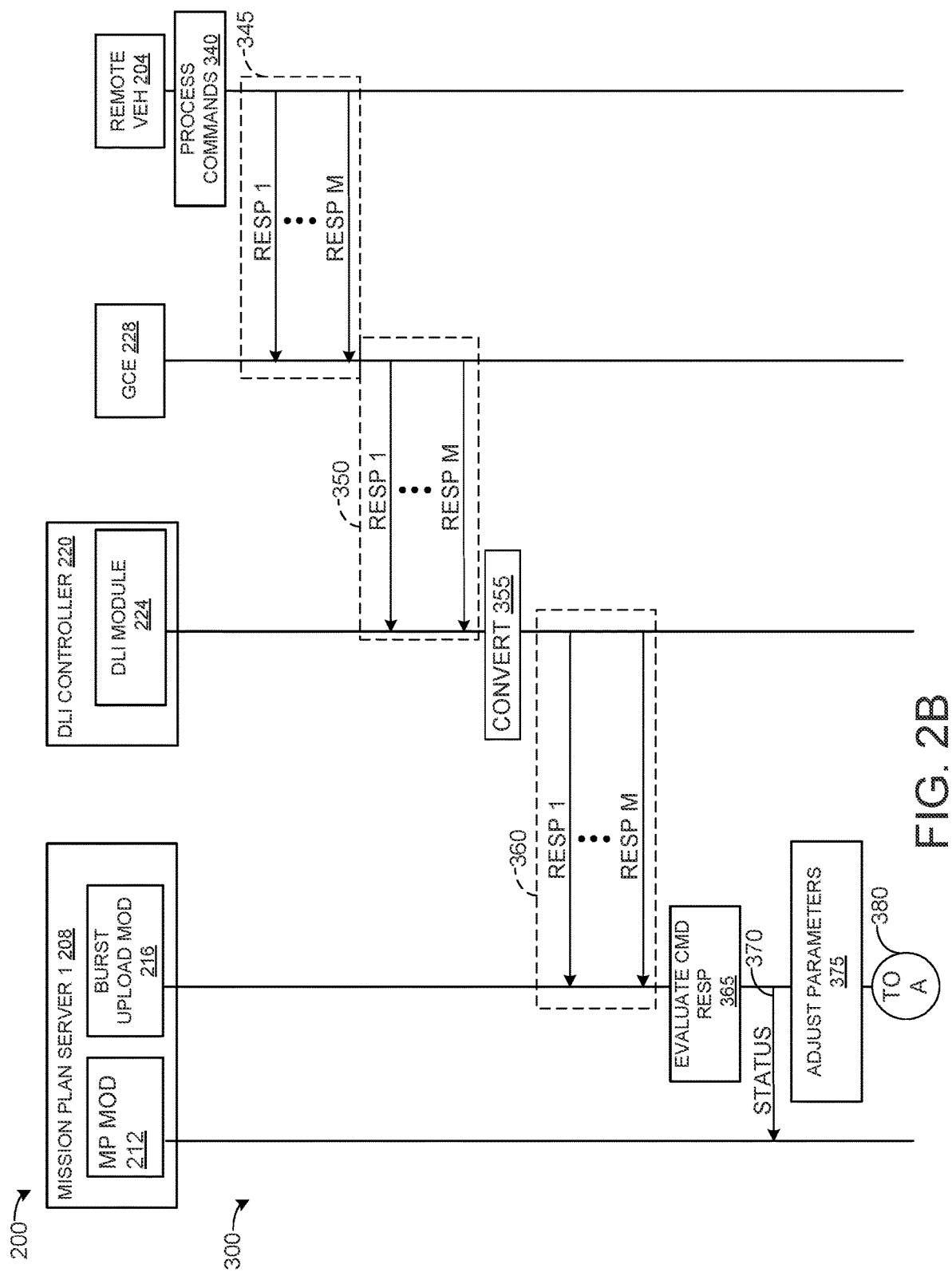

FIGS. 2A and 2B illustrate a sequence diagram depicting a system 200 (e.g., the system 100) executing a method 300 to upload a mission plan to a deployed remote vehicle 204 (e.g., the deployed remote vehicle 108 of FIG. 1).

The system 200 includes a mission plan server 208 (e.g., the mission plan server 112 of FIG. 1). The mission plan server 208 executes a mission plan module 212 (e.g., the mission plan module 132 of FIG. 1) and a burst upload module 216 (e.g., the burst upload module 152 of FIG. 1). The server 208 communicates with a DLI controller 220 (e.g., the DLI controller 136 of FIG. 1) through a network (e.g., the network 128 of FIG. 1, omitted in FIGS. 2A and 2B).

The DLI controller 220 executes a DLI module 224 (e.g., the DLI module 150 of FIG. 1). The system 200 also includes a GCE 228 that communicates with the DLI module 224 and the deployed remote vehicle 204. More particularly, the GCE 228 includes an antenna to enable wireless communications between the deployed remote vehicle 204 and the GCE 228.

As illustrated in FIG. 2A, at 305, the mission plan module 212 generates (or updates) a mission plan (e.g., the mission plan 104 of FIG. 1). The mission plan includes a set of ordered commands, such as two or more commands (10,000 or more commands in some examples). At 310, the mission plan is provided to the burst upload module 216.

Responsive to receipt of the mission plan, the method 300 proceeds from node A to initiate and upload of the mission plan to the deployed remote vehicle 204. At 310, the burst upload module 216 selects a subset of the commands to upload to the deployed remote vehicle 204 in a burst mode operation. The number of commands in the subset of commands is based on burst mode parameters. In the example illustrated, there are K number of commands in the subset of commands, where K is an integer greater than or equal to one.

At 315, the burst upload module 216 encapsulates the subset of commands into a first protocol, such as UDP. At 320, the burst upload module 216 transmits the K number of commands (labeled CMD 1 . . . . CMD K) in the subset of commands to the DLI module 224 as a series of packets in the first protocol. A wait time (e.g., a burst rate) is added between each of the K number of commands, and this wait time is specified in the burst mode parameters. That is, there is a wait time between CMD 1 and CMD 2 that is specified by the burst mode parameters. The subset of commands are provided on a first data stream.

The DLI module 224 executing on the DLI controller 220 receives the subset of commands. At 325, the DLI module 224 converts the subset of commands encapsulated in the first protocol to a second protocol (e.g., a protocol conforming to the MIL-STD-1553 standard or the IEEE 1394 standard). At 330, the DLI module 224 buffers the subset of commands in packets of the second protocol. At 335, the DLI module 224 transmits the subset of commands in the packets of the second protocol to the GCE 228 on a second data stream.

Responsive to the subset of commands, at 338, the GCE 228 wirelessly transmits the subset of commands (K number of commands) to the deployed remote vehicle 204. Continuing with the method 300 on FIG. 2B, at 340, the deployed remote vehicle 204 processes the commands received from the GCE 228. Processing of the commands includes un-encapsulating the commands from the packets of the second protocol, and accepting or rejecting to the commands. Acceptance of a given command indicates that the given command will be executed during prosecution of a mission plan. Rejection of a given command indicates that the command will not be executed, and in fact, the mission plan will not be executed by the deployed remote vehicle 204. Additionally, for each command, the deployed remote vehicle 204 generates a response message, such that there are M number of response messages, where M is less than or equal to K. However, the order of the M number of response messages does not necessarily match the order of the command messages in the subset of commands.

At 345, the M number of response messages are encapsulated into packets of the second protocol by the deployed remote vehicle and are wirelessly transmitted to the GCE 228. In response, at 350, the GCE 228 forwards the M number of response messages to the DLI module 224. At 355, in response to the M number of response messages encapsulated in packets of the second protocol, the DLI module 224 converts the M number of response messages to the first protocol. At 360, the DLI module 224 transmits the M number of response messages to the burst upload module 216.

At 365, the burst upload module 216 evaluates each of the M number of response messages to determine if each of the K number of commands in the subset of commands has been accepted. If one or more of the K number of commands has been rejected by the deployed remote vehicle 204 and/or if there are less response messages than commands in the subset (e.g., M is less than K), indicating that the deployed remote vehicle 204 did not receive each of the K number of commands in the subset of commands, the burst upload module 216 terminates the upload of the mission plan and at 370, the burst upload module 216 provides a status indicator to the mission plan module 212 indicating that the mission plan upload has been terminated.

If each of the M number of response messages indicates that each of the K number of commands has been accepted by the deployed remote vehicle 204, at 375, the burst upload module 216 can adjust the burst parameters, such as increasing or decreasing the number of commands in a next subset of commands or increasing or decreasing the burst wait time for the next subset of commands. At 380, the method 300 returns to node A of FIG. B, such that the next subset of commands can be transmitted in a similar manner.

The method 300 continues until either a command is rejected by the deployed remote vehicle 204 or until each command in the mission plan has been transmitted and accepted by the deployed remote vehicle 204.

Figure 3:
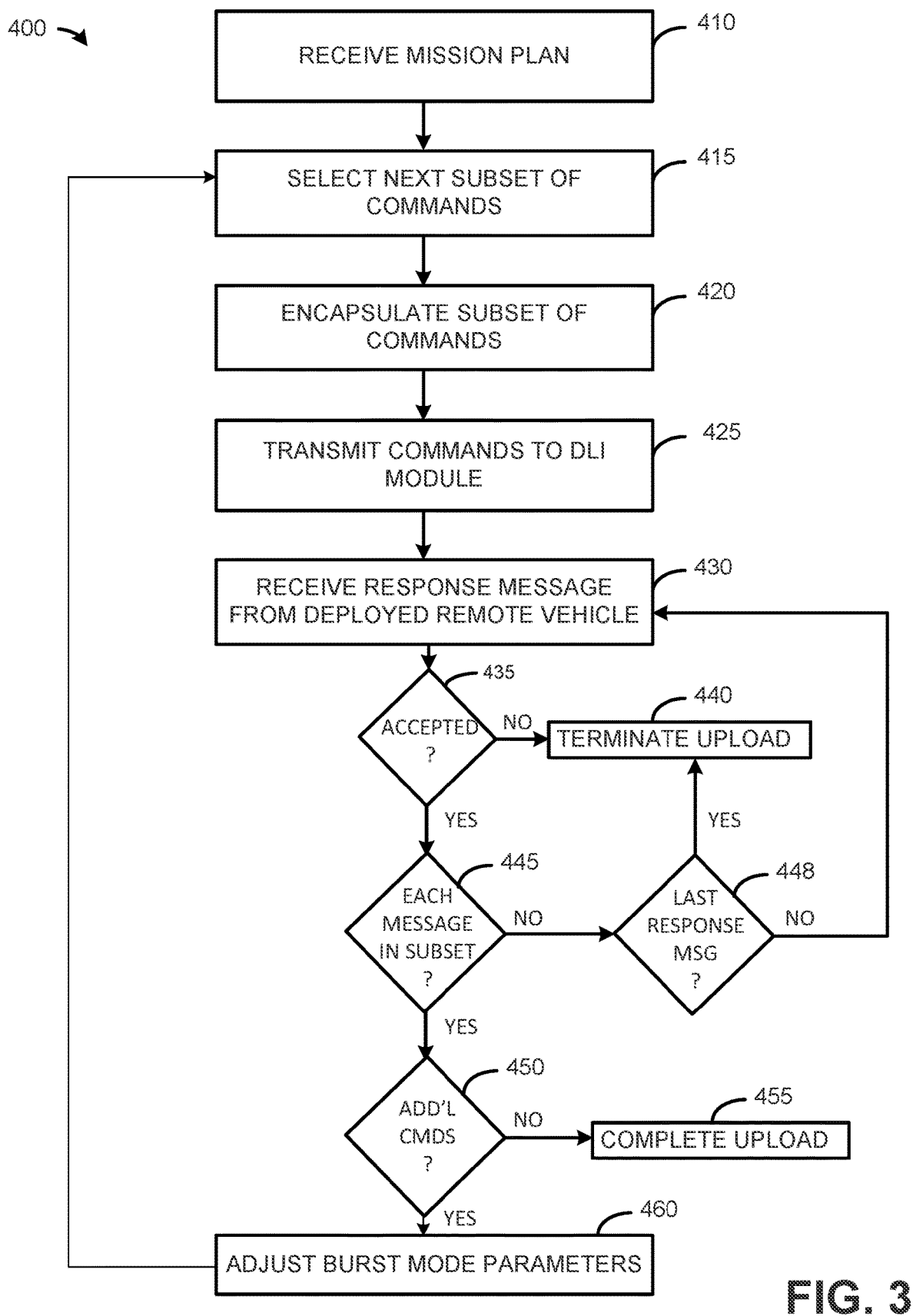
FIG. 3 illustrates a flowchart of an example method for uploading a mission plan to a deployed remote vehicle using burst mode operations.

In view of the foregoing structural and functional features described above, an example method will be better appreciated with reference to FIG. 3. While, for purposes of simplicity of explanation, the example method of FIG. 3 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 3 illustrates a flowchart of an example method 400 for uploading a mission plan to a deployed remote vehicle (e.g., deployed remote vehicle 108 of FIG. 1) using burst mode operations. The method 400 can be executed by a burst upload module (e.g., the burst upload module 152 of FIG. 1 and/or the burst upload module 216 of FIGS. 2A and 2B) executing on a computing platform (e.g., the mission plan server 112 of FIG. 1).

At 410, the burst upload module receives the mission plan from a mission plan module (e.g., the mission plan module 132 of FIG. 1) executing on a computing platform (e.g., the same or a different computing platform). The mission plan includes a plurality of commands for the deployed remote vehicle, which can alternatively be referred to as an order set of commands. At 415, the burst mode module selects a next subset of the plurality of commands for the deployed remote vehicle. The number of commands (e.g., 3-10) in the selected subset of commands is based on burst parameters. At 420, the burst upload module encapsulates the selected subset of commands into packets of a first protocol (e.g., UDP). At 425, the burst mode module transmits the selected subset of commands to a DLI module (e.g., the DLI module 150 of FIG. 1) operating on a DLI controller (e.g., the DLI controller 136 of FIG. 1). A delay, namely a burst rate specified in the burst rate parameters is added between the sending of each command in the subset of commands. In response, the DLI module and a GCE (e.g., the GCE 154 of FIG. 1) operate in concert to provide the deployed remote vehicle with the selected subset of commands in packets in a second protocol (e.g., a protocol conforming to the MIL-STD-1553 standard or the IEEE 1394 standard), in a manner described herein.

The deployed remote vehicle generates a response message for each command in the subset of commands indicating whether the corresponding command has been accepted or rejected. The response messages are processed and routed through the GCE and the DLI module back to the burst upload module in the manner described. There are an equal number of response messages as command messages in the selected subset of messages. At 430, the burst upload module receives a given response message (e.g., a next response message) of the response messages. At 435, a determination is made by the burst upload module as to whether the given response message indicates that the corresponding command message has been accepted. If the determination at 435 is negative (e.g., NO), indicating that the corresponding command has been rejected by the deployed remote vehicle, the method 400 proceeds to 440. If the determination at 435 is positive (e.g., YES), indicating that the corresponding command has been accepted by the deployed remote vehicle, the method 400 proceeds to 445. At 440, the method 400 terminates the upload of the mission plan. In some examples, the burst upload module provides a notification of the termination to the mission plan module.

At 445, a determination is made by the burst upload module as to whether the given response message is the each message for the selected subset of commands. Stated differently, at 445, the burst upload module determines if the response message has been received for each command in the selected subset of commands. If the determination at 445 is negative (e.g., NO), the method 400 proceeds to 448. If the determination at 445 is positive (e.g., YES), the method 400 proceeds to 450.

At 448, a determination is made by the burst upload module as to whether a last response message has already been received (e.g., has a timeout for response messages expired without receiving another response message?). If the determination is positive (e.g., YES), the burst mode module determines that at least one command in the given subset of commands has not been received by the deployed remote vehicle, and the method 400 proceed to 440. If the determination at 448 is negative (e.g., NO), the method 400 returns to 430.

At 450, the burst upload module makes a determination as to whether additional commands in the set of command for the mission plan need to be sent to complete the upload of the mission plan to the deployed remote vehicle. If the determination at 450 is negative (e.g., NO), the method 400 proceeds to 455. If the determination at 450 is positive (e.g., YES), the method 400 proceeds to 460. At 450, the upload of the mission plan is completed, and the method 400 ends. In some examples, the burst mode module can provide the mission plan module with an indication that the upload of the mission plan has been completed. At 460, the burst mode parameters are adjusted based on the response messages, and the method 400 returns to 415.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A non-transitory machine readable medium having machine executable instructions comprising:
   a mission plan module that generates a mission plan for a deployed remote vehicle based on user input, wherein the mission plan comprises a plurality of commands for the deployed remote vehicle; and
   a burst upload module that:
   receives the mission plan;

selects a given subset of commands of the plurality of commands for the deployed remote vehicle;

transmits the given subset of commands to a data link interface (DLI) module over a network, the given subset of commands is transmitted with a burst mode operation based on burst rate parameters, causing the DLI module to transmit the given subset of commands to the deployed remote vehicle through a ground communication element;

receives a set of response messages from the remote vehicle responsive to the given subset of commands;

selects a next subset of commands of the plurality of commands for the deployed vehicle; and transmits the next subset of commands to the DLI module over the network if the response messages indicate that each command in the given subset of commands has been accepted for execution by the deployed remote vehicle and terminates a transmission of the plurality of commands if the response messages indicate that a particular command in the given subset of commands has been rejected for execution by the deployed remote vehicle.

2. The medium of claim 1, wherein the burst mode module adjusts the burst rate parameters in further response to the response messages indicating that each command in the given subset of commands are accepted by the deployed remote vehicle.

3. The medium of claim 2, wherein the adjustment at least one of increases a number of commands in the next subset of commands and decreases an interval of time between transmission of commands in a the next subset of commands.

4. The medium of claim 1, wherein each response message in the set of response messages corresponds to a particular command in the given subset of commands.

5. The medium of claim 4, wherein the set of response messages are received in a sequence for corresponding particular commands that is in a different sequence from which the given subset of commands are transmitted.

6. The medium of claim 1, wherein the deployed remote vehicle is an unmanned ariel vehicle.

7. The medium of claim 1, wherein the DLI module communicates with a ground communication element that wirelessly transmits the given subset of commands to the deployed remote vehicle through a ground communication element.

8. A system for uploading a mission plan to a deployed remote vehicle, the system comprising:

a non-transitory memory for storing machine executable instructions; and a processor core that accesses the memory and executes the machine executable instructions, the machine executable instructions comprising:

a mission plan module that generates a mission plan for a deployed remote vehicle based on user input, wherein the mission plan comprises a plurality of commands for the deployed remote vehicle; and a burst upload module that:

receives the mission plan;

selects a given subset of commands of the plurality of commands for the deployed remote vehicle;

transmits the given subset of commands to a data link interface (DLI) module on a first stream of packets of a first protocol, the given subset of commands is transmitted with a burst mode operation based on burst rate parameters;

receive a set of response messages from the remote vehicle responsive to the given subset of commands;

selects a next subset of commands of the plurality of commands for the deployed remote vehicle; and transmits the next subset of commands on the first stream of packets of a first protocol if the response messages indicate that each command in the given subset of commands has been accepted for execution by the deployed remote vehicle and terminates a transmission of the plurality of commands if the response messages indicate that a particular command in the given subset of commands has been rejected for execution by the deployed remote vehicle;

a DLI controller that executes the DLI module, wherein the DLI module:

converts the first stream of packets in the first protocol into a second stream of packets in a second protocol;

transmits the second stream of packets to a ground communication element (GCE); and the GCE comprising an antenna that:

wirelessly communicates with the deployed remote vehicle to send the second stream of packets to the deployed remote vehicle and to receive the set of response messages from the deployed remote vehicle.

9. The system of claim 8, wherein the burst mode module adjusts the burst rate parameters in further response to the response messages indicating that each command in the given subset of commands are accepted by the deployed remote vehicle.

10. The system of claim 9, wherein the adjustment at least one of increases a number of commands in the next subset of commands and decreases an interval of time between transmission of commands in the next subset of commands.

11. The system of claim 8, wherein each response message in the set of response messages corresponds to a particular command in the given subset of commands.

12. The system of claim 11, wherein the set of response messages are received in a sequence for corresponding particular commands that is different than a sequence in which the given subset of commands are transmitted.

13. The system of claim 8, wherein the deployed remote vehicle is an unmanned ariel vehicle.

14. The system of claim 8, wherein the first protocol is the user datagram protocol (UDP) and the second protocol is defined in the MIL-STD-1553 standard or the Institute of Electrical and Electronics Engineers (IEEE) 1394 standard.

15. A method for transmitting a mission plan to a deployed remote vehicle comprising:

receiving, by a burst upload module executing on a computing platform, a mission plan for a deployed remote vehicle, wherein the mission plan comprises a plurality of commands for the deployed remote vehicle;

selecting, by the burst upload module, a given subset of commands of the plurality of commands for the deployed remote vehicle;

transmitting, by the burst upload module, the given subset of commands to a data link interface (DLI) module over a network, wherein the given subset of commands is transmitted with a burst mode operation based on burst rate parameters, causing the DLI module to transmit the given subset of commands to the deployed remote vehicle through a ground communication element;

receiving, by the burst upload module, a set of response messages from the remote vehicle responsive to the given subset of commands; and transmitting, by the burst upload module, a next subset of commands of the plurality of commands to the DLI module over the network if the response messages indicate that each command in the given subset of commands has been accepted for execution by the deployed remote vehicle and terminates a transmission of the plurality of commands if the response messages indicate that a particular command in the given subset of commands has been rejected for execution by the deployed remote vehicle.

16. The method of claim 15, further comprising adjusting, by the burst upload module, the burst rate parameters in further response to the response messages indicating that each command in the given subset of commands are accepted by the deployed remote vehicle.

17. The method of claim 16, wherein the adjusting at least one of increases a number of commands in the next subset of commands and decreases an interval of time between transmission of commands in the next subset of commands.

18. The method of claim 15, wherein each response message in the set of response messages corresponds to a particular command in the given subset of commands, and the set of response messages are received in a sequence for corresponding particular commands that is different from a sequence for which the given subset of commands are transmitted.

19. The method of claim 15, wherein the deployed remote vehicle is an unmanned ariel vehicle.

20. The method of claim 15, wherein the DLI module communicates with a ground communication element that wirelessly transmits the given subset of commands to the deployed remote vehicle through a ground communication element.

* * * * *